United States Patent [19]
Hashimoto

[11] Patent Number: 5,230,310
[45] Date of Patent: Jul. 27, 1993

[54] COMBUSTION CHAMBER OF INTERNAL COMBUSTION ENGINE

[75] Inventor: Noboru Hashimoto, Hiroshima, Japan

[73] Assignee: Mazda Motor Corporation, Hiroshima, Japan

[21] Appl. No.: 859,017

[22] Filed: Mar. 30, 1992

[30] Foreign Application Priority Data

Mar. 29, 1991 [JP] Japan .................................. 3-067205
Mar. 30, 1991 [JP] Japan .................................. 3-093114

[51] Int. Cl.$^5$ ............................................. F01L 3/06
[52] U.S. Cl. ................................ 123/188.8; 123/188.7
[58] Field of Search ..................... 123/188.7, 188.8; 29/888.06, 888.44

[56] References Cited

U.S. PATENT DOCUMENTS

| | | | |
|---|---|---|---|
| 4,407,242 | 10/1983 | Blum | 123/188.8 |
| 4,756,281 | 7/1988 | Chen et al. | 123/188.8 |

FOREIGN PATENT DOCUMENTS

| | | | |
|---|---|---|---|
| 55-104519 | 8/1980 | Japan . | |
| 56-18019 | 2/1981 | Japan . | |
| 0099705 | 4/1990 | Japan | 123/188.8 |

*Primary Examiner*—E. Rollins Cross
*Assistant Examiner*—Erick Solis
*Attorney, Agent, or Firm*—Keck, Mahin & Cate

[57] ABSTRACT

An engine combustion chamber has a protruding wall disposed around a part of each valve seat of either an intake port or an exhaust port. The protruding wall extends in a direction in which a valve for the intake or exhaust port lifts up and down within the combustion chamber and is formed so as to have a jut from a periphery of each valve seat which is set to be less than the larger of a valve lift of the valve of the intake or exhaust port at its top dead center position and a product of a constant and a crank angle from a top dead center of a valve of the other port until the valve of the other port is substantially closed after the top dead center position thereof. A protruding wall gap between inner wall surface of the combustion chamber and an outer periphery of the largest diameter of a valve head of the valve is smaller than the jut, and a valve gap between the outer periphery of the largest diameter of a valve head and an inner periphery of the largest diameter of the combustion chamber is larger than the protruding wall gap.

6 Claims, 8 Drawing Sheets

COMBUSTION CHAMBER OF INTERNAL COMBUSTION ENGINE

BACKGROUND OF THE INVENTION

1. Field of the Invention

The present invention is concerned with the structure of cylinder heads of internal combustion engines and, more particularly, with a cylinder head structure which improves flowing of a fuel mixture into an exhaust port.

2. Description of Related Art

In conventional engines, improvements in air intake and gas discharge or scavenging efficiencies have been accomplished by maximizing the area of exhaust ports. In addition, improvements in fuel combustion efficiency have been accomplished through the adaptation of compact combustion chambers, measurably improving engine output. In order to assure a sufficient valve opening area for such an engine, each cylinder is provided with multiple valves. The valve intake ports and exhaust ports of the multiple valve engine are located in close proximately. Because of this, in a valve overlap period, in which both an intake valve and an exhaust valve open, a fresh air fuel mixture introduced into the combustion chamber through the intake port is apt to be immediately expelled or blown through the exhaust port, resulting in a deterioration of emission performance, a decrease in engine output, and/or a reduction in fuel efficiency. Hence, consideration has been given to the establishment of walls around the intake port or the exhaust port. For example, Japanese Unexamined Patent Publication No. 55-104,519 discloses an engine in which a wall is formed so as to extend within the combustion chamber and surround the intake port, thereby directing the flow of fuel mixture introduced into the combustion chamber in an intended direction.

In an engine such as that described in the publication mentioned above, in which a wall surrounds an intake port, if a gap or space between the margin of an intake valve head, which is the portion of the valve having the largest diameter, and the wall is too large, then the wall will not effectively constrict a flow of fresh air which travels towards the exhaust port. A flow-through of fresh air, therefore, will not be effectively prevented. However, if this gap or space is small, resistance to intake air is increased, reducing the charging efficiency of fresh air. This leads to a reduction in engine output. In addition, if the protrusion of the wall is too large, a period of time in which air flow is constricted will be lengthened, increasing intake air resistance. This leads to a reduction in charging efficiency of fresh air and, consequently, to a decrease in engine output. It also becomes difficult to produce a tumble or turbulent flow of the fuel mixture within the cylinder, resulting in a deterioration in fuel combustion characteristics.

During valve overlap, exhaust gases within a combustion chamber are forced toward an exhaust port by incoming fresh air and are discharged or scavenged through the exhaust port. In order to improve scavenging efficiency, the cylinder head should be structured so as to make this scavenging action efficiently. Particularly, in order for engines equipped with superchargers to meet the demand to achieve improved knock resistance, it is desirable to promote scavenging action with the pressurized fresh intake air while the engine is supercharged, so as to realize a measurable reduction in the temperature of the fuel mixture within the cylinders caused by a reduction in the amount of gases remaining in the cylinders.

SUMMARY OF THE INVENTION

The object of this invention is to provide an improved combustion engine which can effectively prevent the flow-through of fresh intake air and promote exhaust gas scavenging, without increasing air intake resistance, thereby providing measurable improvements in engine output and fuel efficiency as well as in emission control.

This object is achieved by providing a particular combustion chamber structure for a multiple valve, multiple cylinder internal combustion engine. The combustion chamber is formed with a protruding wall which surrounds a part of a valve seat of at least one of the intake and exhaust ports adjacent the other port so as to extend in a direction in which a valve for opening and closing the one port lifts up and down within the combustion chamber. The protruding wall is formed so as to have a "jut" or protrusion extending from a periphery of the valve seat. The protrusion is set to be smaller than the larger of a valve lift of the valve at its top dead center position and a crank angle from a top dead center position of a valve for the other port until the valve for the other port is substantially closed after the top dead center position Further, the protruding wall is formed so as to have a protrusion gap between its inner wall surface and an outer periphery of the largest diameter of a valve head of the valve which is smaller than the protrusion. A valve gap between the outer periphery of the largest diameter of a valve head and an inner periphery of the largest diameter of the combustion chamber, moreover, is larger than the protrusion gap.

The protruding wall may be formed around either a valve seat of each intake port or a valve seat of each exhaust port. Alternatively, the protruding wall may be formed around the valve seat of each intake port and the valve seat of each exhaust port.

When the internal combustion engine is supercharged, a valve overlap period, during which both the intake valve and the exhaust valve are open, is set longer than when the internal combustion engine is not supercharged.

The combustion chamber is further formed with a tumble or turbulent flow producing wall at a part of an inner periphery of the combustion chamber The tumble flow producing wall extends towards a path in which the intake valve lifts up and down from the valve seat of each intake port. An indentation is formed within a distance from the valve seat of each intake port equal to the jut or protrusion of the protruding wall so as to increase a distance between the tumble flow producing wall and the outer periphery of the largest diameter of an intake valve head.

In a combustion chamber construction according to the present invention, the jut of the protruding wall is established so that it is less than the greater of the values of the valve lift of the intake valve at a top dead center position and a product obtained by multiplying 0.15 and the crank angle from the top dead center position until the exhaust valve is substantially closed after the top dead center position. Hence, the jut of the protruding wall neither greatly exceeds the valve lift of the intake valve at the termination of the valve overlap period nor is too large. Through the provision of the protruding wall, therefore, an increase in intake air resistance is minimized. In addition, the gap between the protruding wall and the margin of the intake valve head is established so that it is smaller than the size or height of the jut of the protruding wall. Hence, the flow passage constriction of fresh intake air at the protruding wall effectively prevents the flow-through of fresh air. In addition, the gap between the margin of the intake valve head and the inner circumferential surface of the combustion chamber wall is established so that it is greater than the gap between the margin of the intake valve head. Consequently, fresh intake air flows towards the combustion chamber from the bore circumference side of the intake port. Also, the fresh air, which flows in along the head surface of the piston from the bore circumference side near the intake port, forms a reverse tumble or turbulent flow toward the side of the exhaust port. As a result, residual exhaust gas is forced towards the exhaust port with an effectively improved scavenging action.

The valve overlap period is set relatively long for an engine with a supercharger. Therefore, the supercharged intake air effectively forces out the residual exhaust gas with a measurable increase in scavenging action.

The provision of the turbulence producing wall enables the promotion of a tumble or turbulent air mixture flow within the cylinder. This facilitates the production of a measurable improvement in fuel consumption and burning characteristics. An indentation is formed above the turbulence or tumble flow producing wall so as to provide a large distance between the tumble flow producing wall and the margin of the intake valve head. Therefore, at the place at which the protruding wall disappears, i.e., from a time the valve overlap terminates, the tumble flow producing wall causes a flow passage constriction for fresh intake air from the intake port on the side of the circumferential periphery of the cylinder. As a result, fresh intake air flows into the combustion chamber primarily from the intake port on the side of the exhaust port. The fresh intake air which flows in from the intake port on the side of the exhaust port also flows over the top surface of the piston from the cylinder wall on the side of the exhaust port, thereby promoting travel of a tumble air mixture flow towards the side of the intake port so that an improved combustion efficiency is produced.

Providing the protruding wall on the side of the exhaust port adjacent the periphery of the intake port in the same manner as on the side of the intake port adjacent the periphery of the exhaust port necessarily minimizes exhaust resistance, thereby preventing the flow-through of fresh air and fuel mixture. In addition, the scavenging action caused by reverse tumble flow of fuel mixture within the cylinder is easily accomplished. A still greater improvement in scavenging action is promoted, therefore.

BRIEF DESCRIPTION OF THE DRAWINGS

The above and other objects and features of the present invention will be apparent to those skilled in the art from the following description of preferred embodiments thereof when considered in conjunction with the accompanying drawings, in which.

DETAILED DESCRIPTION OF THE PREFERRED EMBODIMENTS

Figure 1:
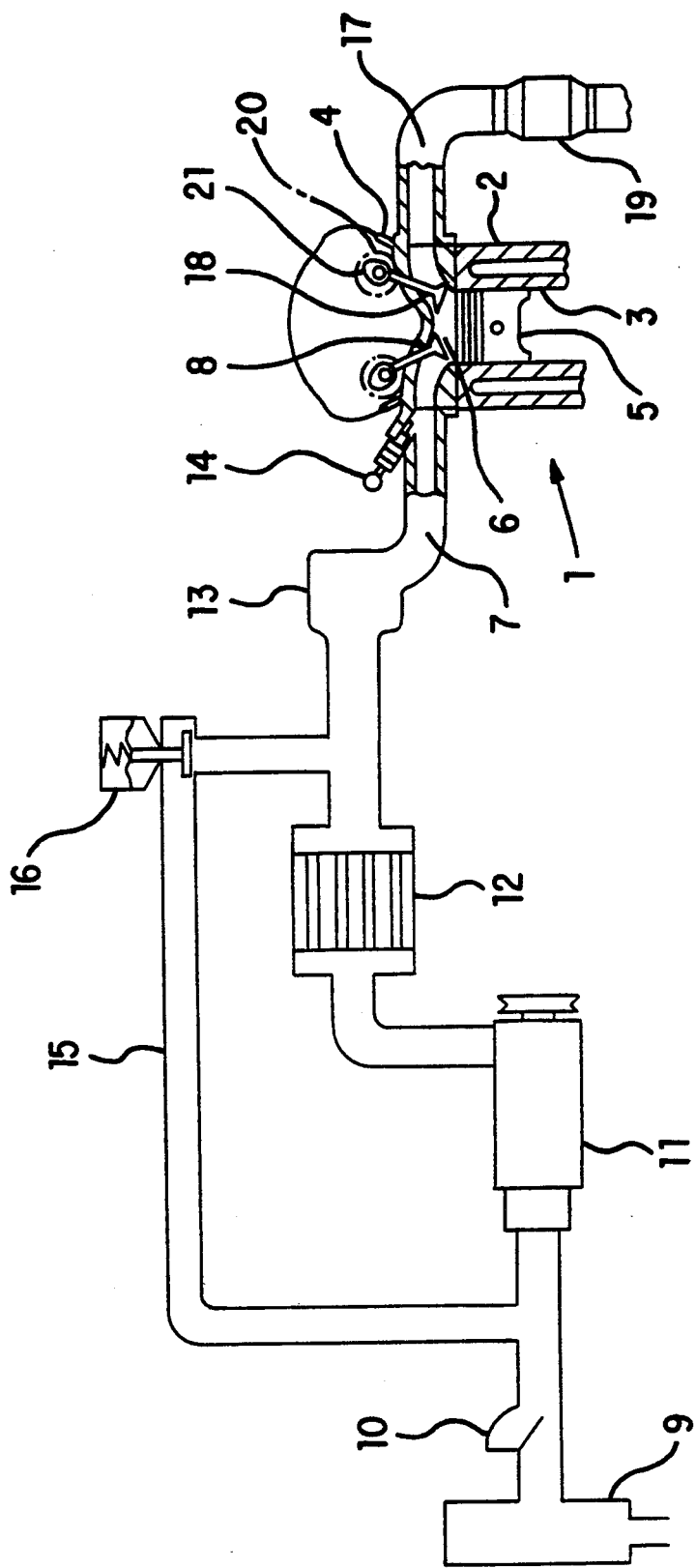
FIG. 1 is a schematic illustration showing an engine having a combustion chamber constructed in accordance with a first preferred embodiment of the present invention.

Referring to the drawings in detail and, in particular, to FIG. 1, an engine 1 in accordance with a preferred embodiment of this invention is provided with a cylinder block 3 in which a plurality of cylinders 2 (only one of which is shown) are formed. A cylinder head 4 is attached to the top of the cylinder block 3, and pistons 5 reciprocally move up and down within respective cylinders 2. Within the cylinder 2 is formed a combustion chamber 6, which is at least partly defined by the lower surface of the cylinder head 4 and the upper surface of the piston 5. An intake passage 7 is connected to the combustion chamber 6, and intake valves 8, 8 are situated in intake ports opening into the combustion chamber 6. Each intake valve 8 opens and closes its intake port at a specified valve timing so that intake air is introduced into the combustion chamber 6. In the intake passage 7, there are arranged, in order from the upstream side, an air cleaner 9, an air flow meter 10 which detects the quantity of intake air admitted into the cylinder during a particular time period, a mechanical supercharger 11 which is driven by the engine 1, an intercooler 12 which cools intake air, a surge tank 13 which absorbs intake air pressure pulsations, and an injector 14 which injects fuel. Furthermore, a bypass passage 15, which bypasses both the supercharger 11 and the intercooler 12, is connected to the intake passage 7. Midway in the bypass passage 15 is situated a supercharger bypass valve 16 which regulates the pressure of air supercharged by the supercharger 11.

The engine 1 has an exhaust passage 17 in communication with the combustion chamber 6 attached to it. Exhaust valves 18, 18 (see FIG. 4) are situated in exhaust ports opening into the combustion chamber 6. Each exhaust valve 18 opens and closes its respective exhaust port at a specified timing so as to permit discharge or expulsion of burned gasses from the combustion chamber 6. On an exhaust camshaft 21, which drives the exhaust valves 18 to open and close the exhaust ports at a specific exhaust valve timing, there is attached a variable valve timing mechanism 20 which changes the specific exhaust valve timing at which the exhaust valves 18 open and close, depending upon driving conditions. The exhaust gases pass through a catalytic converter 19 by which they are purified.

Figure 2:
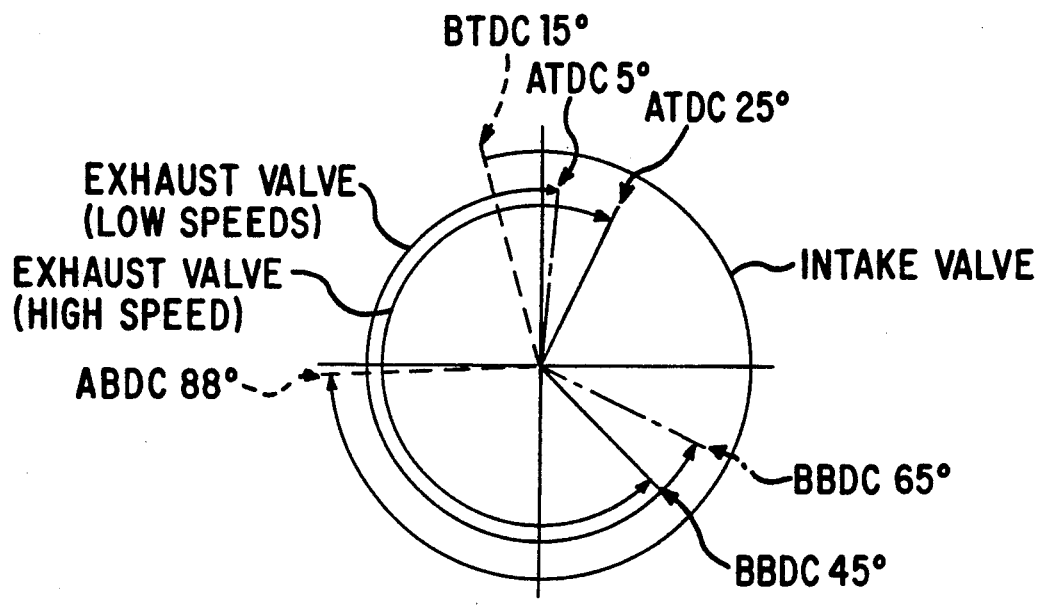
FIG. 2 is a diagram showing valve timing.

Referring to a valve timing diagram shown in FIG. 2, the exhaust valve timing is varied between periods during which the engine 1 operates at low speeds and low engine loads and periods during which the engine operates at high speeds and high engine loads. For instance, when the engine 1 operates at a high speed, an exhaust valve closing point is retarded from an angle of five degrees past the top dead center (TDC) position to an angle of 25 degrees past the top dead center position so as to increase the valve overlap between the intake and exhaust valves. In other words, when the engine 1 operates at low speeds and low engine loads, the period of valve overlap, during which both the intake and exhaust valves 8 and 18 are held open, is defined between an angle of 15 degrees in advance of the top dead center (TDC) position at which the intake valve opens and an angle of 5 degrees after the top dead center (TDC) position at which the exhaust valve 18 closes. On the other hand, when the engine 1 operates at high speeds and high engine loads, the period of valve overlap is defined between an angle of 15 degrees in advance of the top dead center (TDC) position at which the intake valve opens and an angle of 25 degrees after the top dead center (TDC) position at which the exhaust valve 18 closes.

Figure 3:
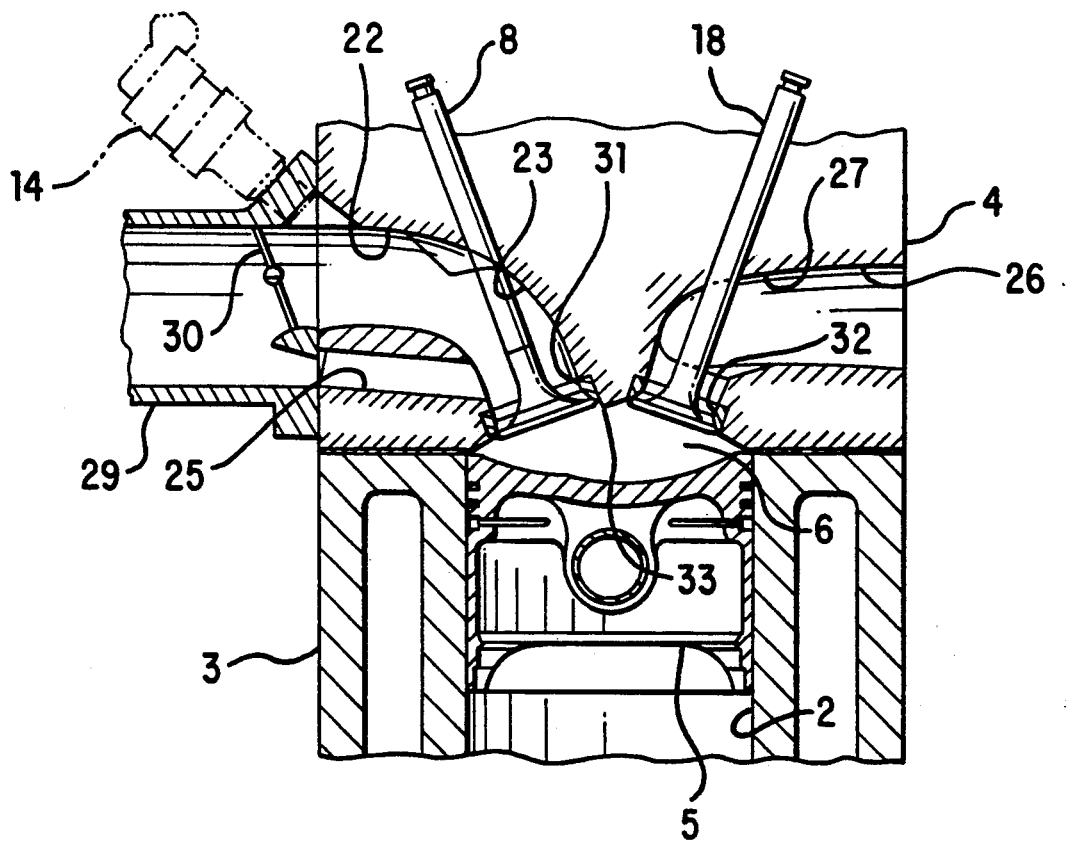
FIG. 3 is a cross-sectional view of a combustion chamber in accordance with the first preferred embodiment of the present invention.
Figure 4:
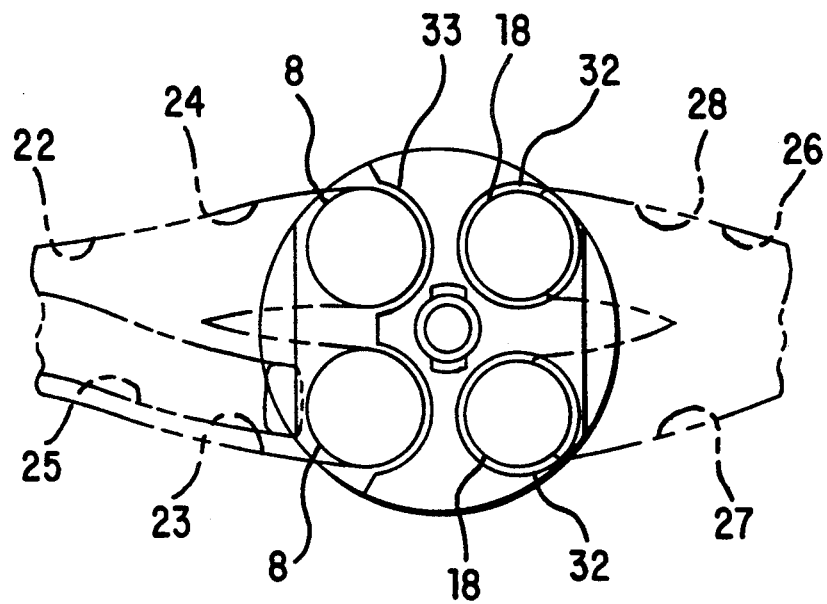
FIG. 4 is a bottom view of the combustion chamber shown in FIG. 3.
Figure 5:
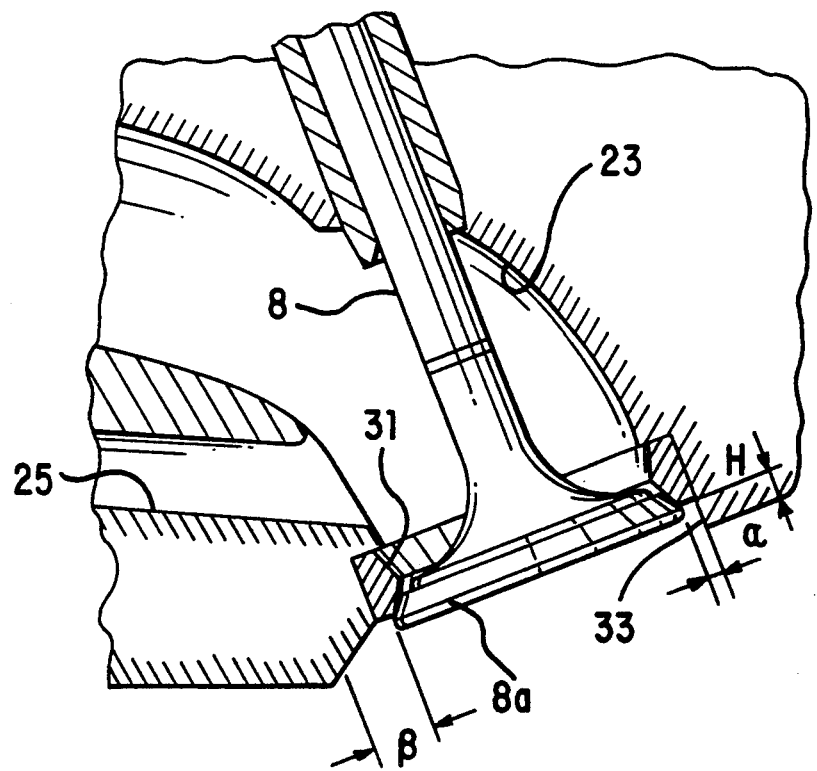
FIG. 5 is an enlarged cross-essential view of an intake port of FIG. 3.

FIGS. 3 through 5 show the particulars of a combustion chamber. On the left side of the cylinder bore of the cylinder head 4, as viewed in FIG. 3, there are formed two independent intake ports 23 and 24, branching off from a single primary intake port 22, which direct fresh air into the cylinder 2. Each independent intake port 23 or 24 is formed so as to open at one end into an inclined surface of the combustion chamber 6 and to be communicated at its opposite end with the primary intake port 22. In addition, there is formed a secondary intake port 25 which opens at one end directly into the independent intake port 23 immediately upstream of the combustion chamber 6, extends along and under the independent intake port 23 and the primary intake port 22, and opens at the opposite end in the side wall of the cylinder head 4 where the primary intake port 22 opens. An intake manifold 29 is connected to the cylinder head 4 so as to be in communication with the primary intake port 22 and the secondary intake port 25. In the intake manifold 29, there is a secondary valve 30 positioned close to the opening of the primary intake port 22. This secondary valve 30 opens so as to allow intake air to flow into the primary intake port 22 when the engine 1 operates at high loads. The secondary valve 30 also closes so as to shut a flow of intake air into the primary intake port 22 and allow a flow of intake air through the secondary intake port 25 when the engine operates at low loads.

On the right side of the cylinder bore of the cylinder head 4, two independent exhaust ports 27 and 28 are formed in the cylinder head 4. First ends of these independent exhaust ports 27 and 28 are, respectively, opened at an inclined wall of the combustion chamber 6. The independent exhaust ports 27 and 28 are arranged opposite the independent intake ports 23 and 24, respectively. The other ends of the independent exhaust ports 27 and 28 merge into a single exhaust port 26 opening at the outer surface of the cylinder head 4.

At the openings of the intake ports 23 and 24 and the exhaust ports 26 and 27, the cylinder head 4 is formed with intake valve seats 31 and exhaust valve seats 32. As shown in FIGS. 4 and 5, around a part of the external circumference of each intake valve seat 31, adjacent to the exhaust port, the cylinder head 4 is formed with a protruding wall 33 which forms a protrusion or jut H extending in a direction of lift of the intake valve 8 within the combustion chamber 6. For instance, in this embodiment, the amount of valve lift (Lit) of the intake valve 8 at the top dead center (TDC) position is set at 1 mm. According to FIG. 2, from the top dead center (TDC) position of the exhaust valve until the exhaust valve 18 is substantially closed after the top dead center (TDC) position, the crank angle is 25 degrees when the engine 1 operates at high speeds or high engine loads. The value A, which is a product of multiplying the crank angle by 0.15, is 3.75 mm. Under these dimensions, a jut H from the valve seat 31 of the protruding wall 33 is set to be less than the greater of the values of the product A and the valve lift (Lit), i.e., less than 3.75 mm. Practically, the jut H is set at 2 mm. A valve lift (Lec) of the intake valve 8, when the exhaust valve 18 is closed i.e., at the end of valve overlap, is set at 3 mm. In addition, a gap $\alpha$ between the largest diameter of a margin of the valve head 8a of the intake valve 8 and the protruding wall 33 is set to be smaller than the jut H, and a gap $\beta$ between the largest diameter of the margin of the valve head 8a of the intake valve 8 and the largest diameter of a periphery of the combustion chamber 6 is set to be larger than the gap $\alpha$.

When the cylinder head 4 is constructed in this way, the protruding wall 33 causes a flow passage within the combustion chamber 6 from near side of the exhaust port of each independent intake port 23 and 24 to be constricted during a period from commencement of the opening of the intake port 8 until the amount of valve lift of the intake valve exceeds the jut H of the protruding wall 33. This enables prevention of flow-through of fresh air, introduced from the independent intake ports 23 and 24, from passing into the independent exhaust ports 27 and 28. In this instance, since the jut H is smaller than the valve lift (Lec) of the intake valve 8 at the termination of valve overlap, there is no constriction in the flow passage. Shortly prior to the termination of valve overlap, the constriction in the flow passage is terminated. This is because near the termination of valve overlap, the valve lift of the exhaust valve 18 is small. During this period, the amount of intake air flow-through is minuscule. The reason for allowing a slight amount of intake air flow-through is that it is of little influence. However, resistance to the flow-through of intake air has an influence which is great and should be suppressed. By means of the protruding wall 33, an increase in intake air resistance is minimized, and the flow-through of fresh air is effectively prevented.

On the other hand, the gap $\beta$ between the largest diameter margin of the valve head 8a of the intake valve 8 and the wall of the combustion chamber 6 at the circumference of the cylinder bore is set so that it is greater than the gap $\alpha$ between the protruding wall 33 and the largest diameter margin of the valve head 8a of the intake valve 8. Owing to this, fresh intake air flows into the combustion chamber 6 from the independent intake ports 23 and 24 on the side of the bore circumference. Also, the fresh intake air which flows in on the side of the bore circumference flows along the top surface of the piston 4 from the cylinder wall on the side of the intake ports within the cylinder 2 A reverse tumble flow which flows towards the exhaust side of the cylinder is formed. By this reverse tumble flow, a scavenging action with an improved scavenging efficiency can be obtained which forces residual exhaust gases, accumulated within the cylinder 2 during the period of valve overlap, towards the independent exhaust ports 27 and 28. Particularly, in an area of engine operating conditions in which supercharging is performed by the supercharger 11, pressurized intake air forces out the residual exhaust gases, thereby further promoting scavenging. This enables a reduction in residual exhaust gases in the cylinder 2, lowering the temperature of the fuel mixture. Because of this, an improvement in anti-knock characteristics when driving in the supercharging engine operating mode can be achieved, enabling an effective increase in engine output. Furthermore, in this embodiment, both the prevention of intake air flow-through and an improvement in scavenging efficiency are accomplished, resulting in improved engine performance, improved emission control and improved fuel economy.

Figure 6:
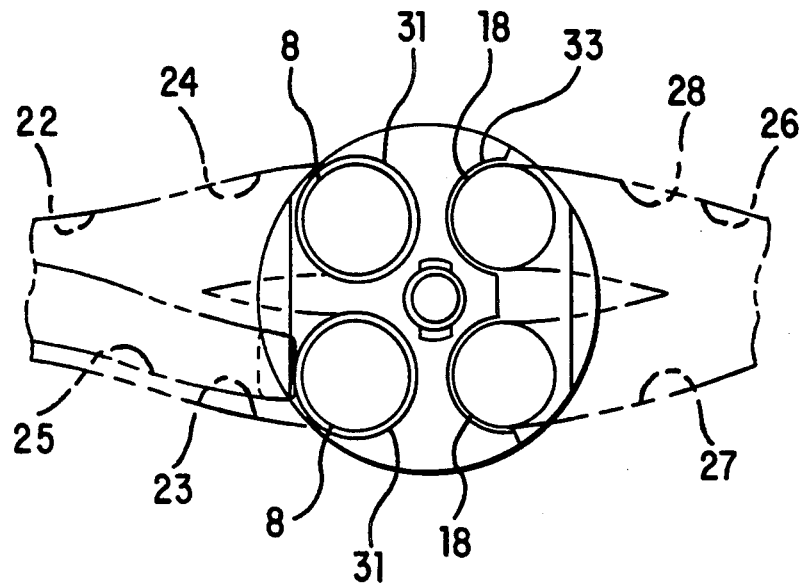
FIG. 6 is a bottom view showing a variation of a protruding wall of the combustion chamber shown in FIG. 3.
Figure 7:
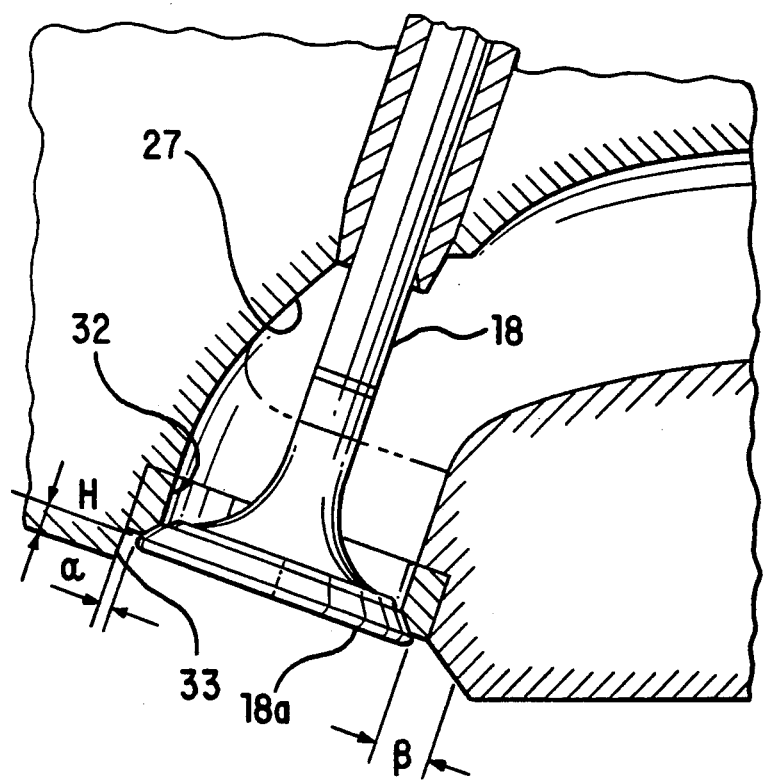
FIG. 7 is an enlarged cross-essential view of an intake port of FIG. 6.

Protruding wall 33 may be formed in connection with each exhaust port 27 and 28 in the same way it is formed in connection with the intake ports, as shown in FIGS. 6 and 7.

Figure 8:
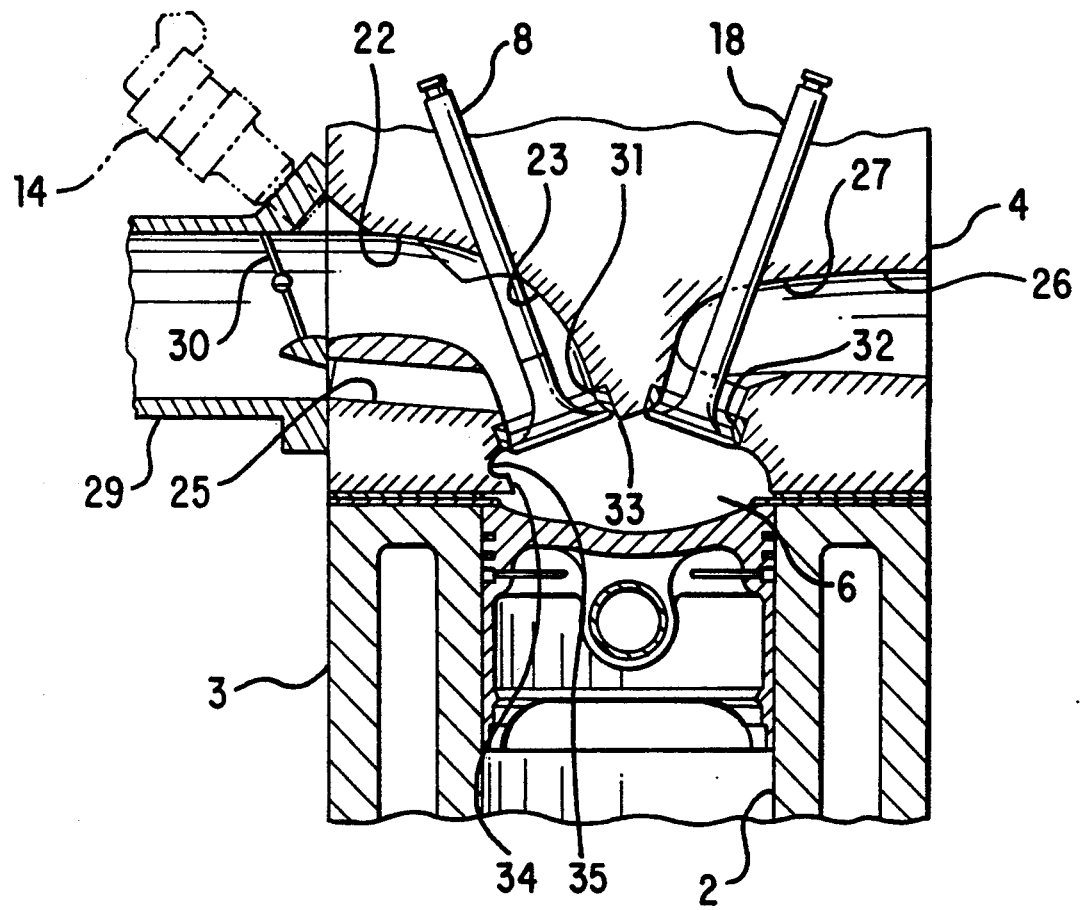
FIG. 8 is a cross-sectional view of a combustion chamber in accordance with another preferred embodiment of the present invention.
Figure 9:
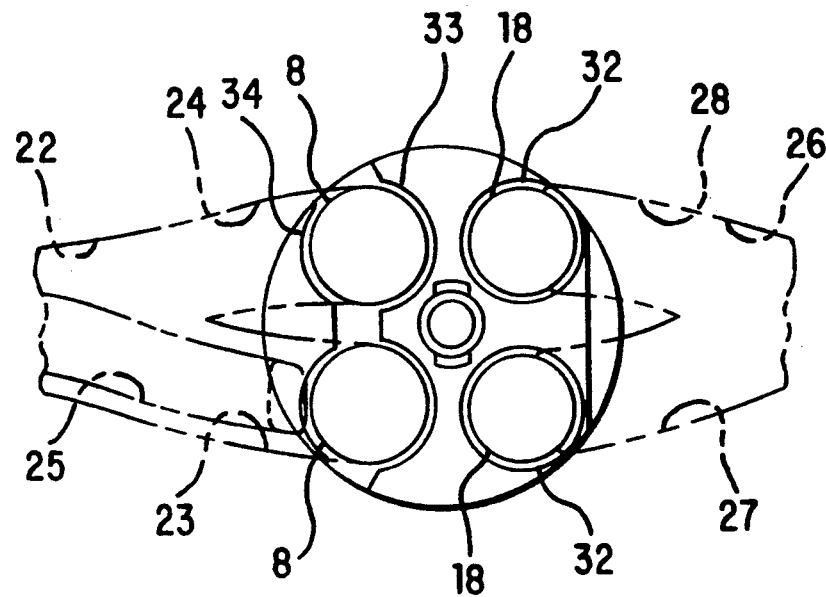
FIG. 9 is a bottom view of the combustion chamber shown in FIG. 8.
Figure 10:
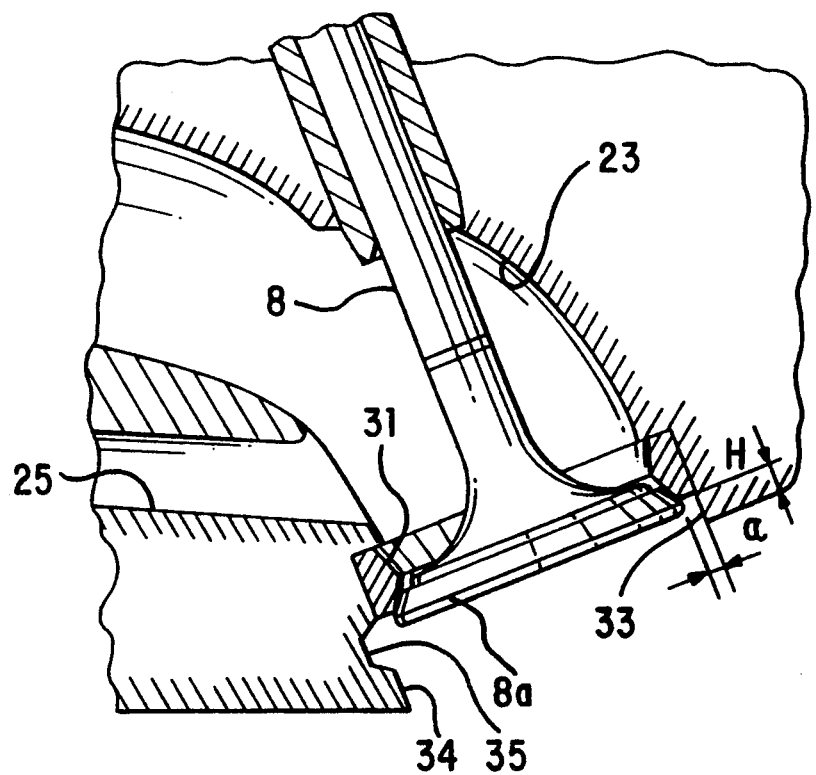
FIG. 10 is an enlarged cross-essential view of an intake port of FIG. 9.

Referring to FIGS. 8, 9 and 10, the combustion chamber of an engine in accordance with another preferred embodiment of this invention is shown. The combustion chamber of this embodiment differs from that of the previous embodiment only in the provision of a tumble flow producing wall. Because other elements or parts are the same as those of the previous embodiment, the same reference numbers have been used to designate the same or similar elements or parts; the following description is primarily directed to the tumble producing wall. As shown, a tumble flow producing wall 34 is formed at the bore periphery of the external circumference of a valve seat 31 of each independent intake port 23 or 24. The wall 34 is formed within a combustion chamber 6 so as to extend towards a path in which an intake valve 8 lifts up and down. This tumble flow producing wall 34 has an undersurface which is flush with the undersurface of the cylinder head 4, and has a specified gap with respect to the largest diameter of the margin of a valve head 8a of the intake port 8. At a distance from the valve seat 31 which corresponds to a jut H of a protruding wall 33, a groove or indentation 35 is formed so that a gap from the largest diameter margin of the valve head 8a of the intake valve 8 is greater than the gap $\alpha$ from the protruding wall 33.

Due to the provision of the tumble flow producing wall 34, when the valve lift of the intake valve 8 is smaller than the jut H of the protruding wall 33, fresh intake air flows through the indentation 35. The same effectiveness as was obtained in the previously embodiment described is thereby obtained. Also, when the valve lift of the intake valve 8 exceeds the jut H of the protruding wall 33 near the termination of valve overlap, the flow passage from the circumference of each intake port 23 or 24 is constricted by the tumble flow producing wall 34. Fresh air is, therefore, formed to flow into the combustion chamber 6 from the independent intake ports 23 or 24 on the side of the adjacent exhaust ports 27 or 28 within the combustion chamber 6. Consequently, fresh intake air, flowing in from the flow passage on the side of the exhaust port, provides a tumble flow, towards the side of air intake from the cylinder wall on the side of the exhaust port, along the top surface of the piston 4 within the cylinder 2.

Figure 11:
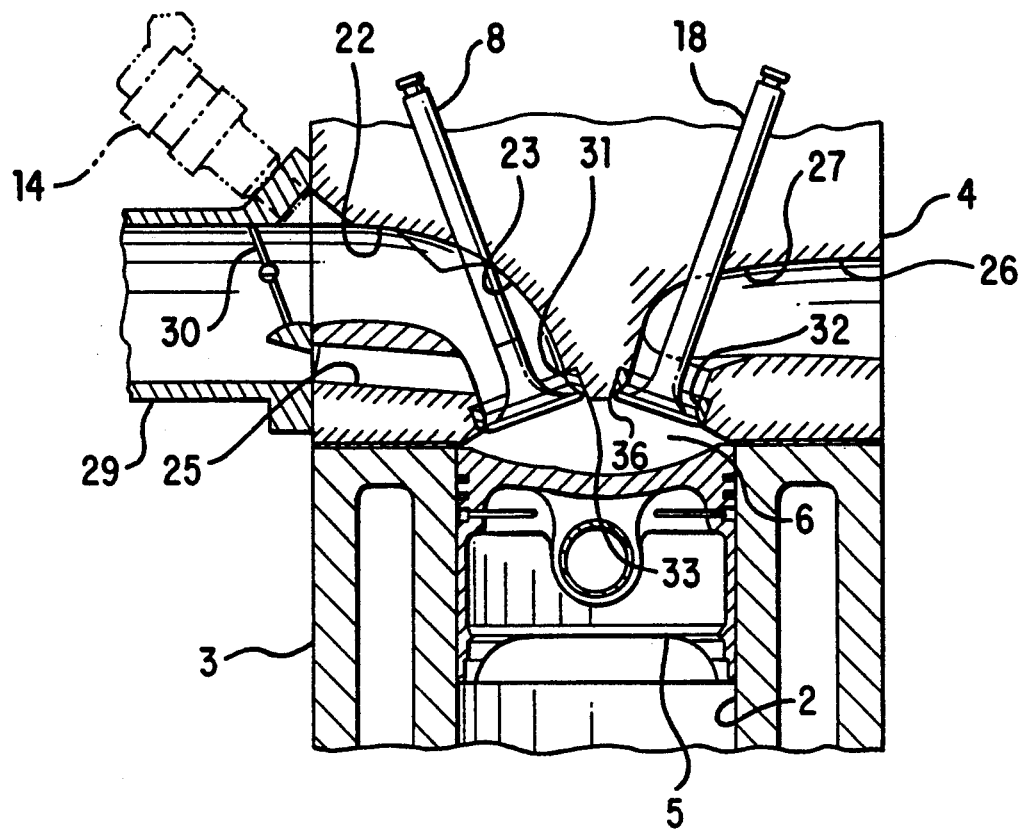
FIG. 11 a cross-sectional view of a combustion chamber in accordance with still another preferred embodiment of the present invention.
Figure 12:
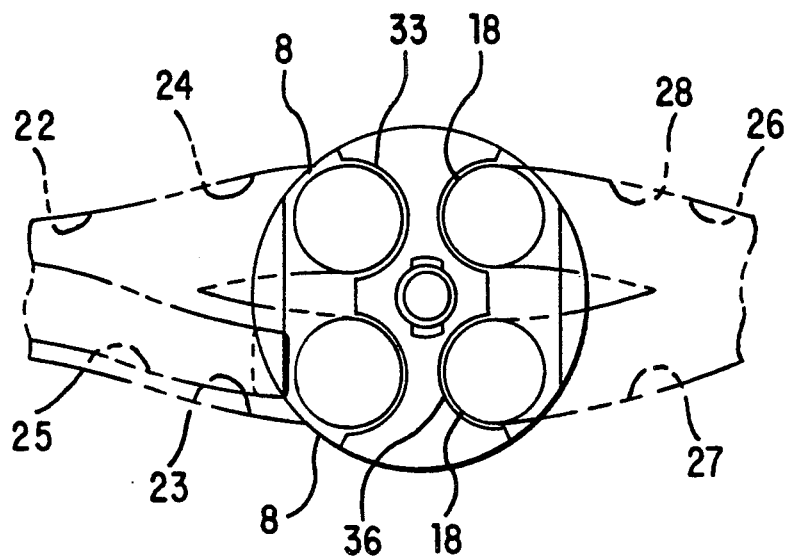
FIG. 12 is a bottom view of the combustion chamber shown in FIG. 11.
Figure 13:
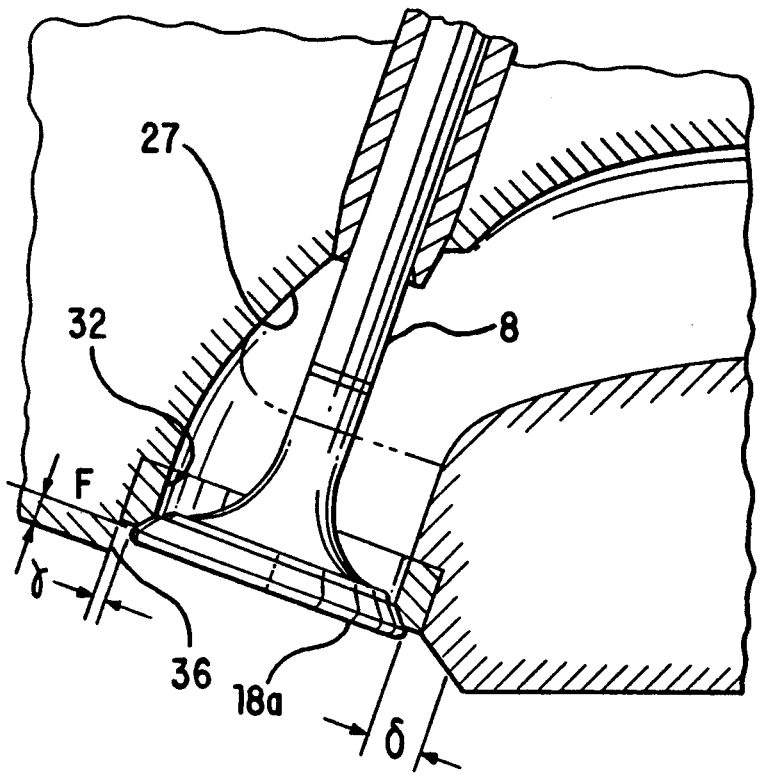
FIG. 13 is an enlarged cross-essential view of an intake port of FIG. 12.
Figure 14:
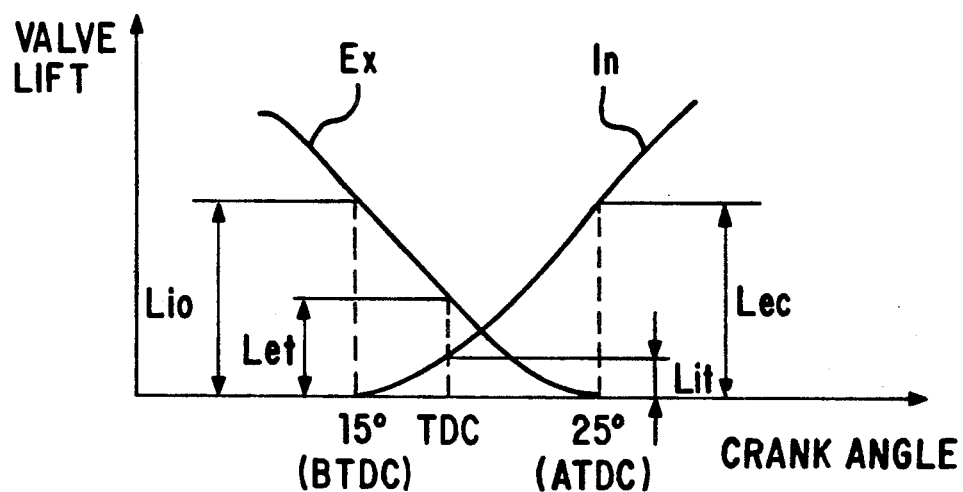
FIG. 14 is a diagram showing valve lift with respect to crank angle.

FIGS. 11, 12 and 13 show a combustion chamber of an engine in accordance with still another preferred embodiment of this invention. This embodiment differs from the first embodiment shown in FIGS. 1 to 5 only in the provision of a protruding wall on the side of exhaust port. Because other elements or parts are the same as those of the first embodiment, the same reference numbers have been used to designate the same or similar elements or parts. The following description will be directed primarily to the tumble flow producing wall. As shown in FIGS. 11 to 13, an exhaust side protruding wall 36 is formed to extend toward the path in which an exhaust valve 18 is lifted up and down. The jut F of the exhaust side protruding wall 36 is established so as to be less than the greater of the valve lift (Let) of the exhaust valve 18 at the top dead center (TDC) position and a product calculated by multiplying a crank angle between the commencement of opening of the intake valve 8 before the top dead center and the top dead center position by 0.15. That is, in this embodiment, as shown in FIG. 12, the valve lift (Let) of the exhaust valve 18 at the top dead center position is established at 2 mm when the engine operates at high speeds, i.e., high engine loads. In addition, according to FIG. 2, the crank angle between the commencement of opening of the intake valve 8 before the top dead center position and the top dead center position is 15 degrees. The value of the crank angle multiplied by 0.15 is 2.25 mm. Therefore, the jut F of the exhaust side protruding wall 36 is established to be less than 2.25 mm and, practically, is set at 2 mm. On the other hand, at the commencement of opening of the intake valve 8, i.e., at the commencement of valve overlap, the valve lift (Lio) of the exhaust valve 18 is established at 3 mm. In addition, a gap $\tau$ between the largest diameter margin of the valve head 18a of the exhaust valve 18 and the exhaust side protruding wall 36 is established to be smaller than the jut F of the exhaust side protruding wall 36. Also, a gap $\delta$ between the largest diameter margin of the valve head 18a of the exhaust valve 18 and the circumference of the combustion chamber 6 is set to be greater than the gap $\tau$.

In this embodiment, by means of the exhaust side protruding wall 36, the flow passage adjacent the intake port of each independent exhaust port 27 or 28 within the combustion chamber 6 is constricted at a valve lift of the exhaust valve 18 less than the jut F of the exhaust side protruding wall 36 when the exhaust valves 18 is closed. During the period in which the valve lift of the exhaust valve 18 is kept less than the jut F of the exhaust side protruding wall 36, fresh air flowing in from the intake port 23, 24 can be prevented from being immediately expelled through the constricted flow passage towards the exhaust ports 27, 28. In this instance, since the jut F of the exhaust side protruding wall 36 is smaller than the valve lift of the exhaust valve 18 at the commencement of valve overlap, at the commencement of valve overlap, there is no constriction in the flow passage. Further, the constriction of flow passage begins shortly after the commencement of valve overlap. Immediately after the commencement of valve overlap, the valve lift of the intake valve 8 is small and, therefore, the amount of fresh air flowing in is also small. Consequently, there is little concern with the problem of flow-through. At this time, no increase in resistance to the passage of exhaust gases caused by the constriction of flow passage is attempted in order to give priority to the expulsion of gases. This effectively prevents intake air from flowing through and minimizes an increase in exhaust resistance. Furthermore, since exhaust gases are expelled from the exhaust port 27 or 28 along the bore circumference within the combustion chamber 6, the scavenging action caused by the intake of fresh air into the cylinder 2 is easily enhanced by intake air, thereby enabling a measurable improvement in scavenging efficiency. These effects accompany the effects from the exhaust side protruding wall 33.

In each embodiment described above, the jut H of the protruding wall 33 is established at 2 mm. However, the jut H of the protruding wall 33 is desirably established to be anywhere within the range of 1.5 to 2.5 mm. Likewise, the jut F of the exhaust side protruding wall 36 is desirably established to be within the range of 1.5 to 2.5 mm. In addition, the intake ports can provide the same effects in a construction in which only a tumble producing intake port, not having the secondary intake port 25 and the secondary valve 30, is provided.

As described above, in a combustion chamber for an engine constructed according to this invention, by means of a protruding wall established at the intake port, intake resistance can be controlled and minimized, effectively preventing the occurrence of flow through of fresh air. In addition, the fresh air forms a reverse tumble flow within the pipe, enabling scavenging of the remaining gas. This provides an improvement in scavenging efficiency. Furthermore, discernible improvements can be achieved in terms of compatibility between the prevention of the flow through of fresh air and the scavenging efficiency. An improved output in terms of engine performance as well as improved fuel economy can thus be obtained.

It is to be understood that although the present invention has been described with respect to preferred embodiments thereof, various other embodiments and variants may occur to those skilled in the art. Any such other embodiments and variants which fall within the scope and spirit of the invention are intended to be covered by the following claims.

What is claimed is:

1. A combustion chamber structure of a multiple cylinder internal combustion engine, comprising:
   a cylinder block including at least one cylinder formed therein;
   a piston reciprocating in said cylinder;
   a cylinder head including more than one intake port opening into each combustion chamber formed by said piston, said cylinder and said cylinder head, each intake port being formed with a valve seat, and more than one exhaust port opening into each combustion chamber, the same number of intake ports and exhaust ports being provided, each exhaust port being formed with a valve seat; and
   a protruding wall formed around a part of each valve seat of at least one of the intake and exhaust ports adjacent the other of said intake and exhaust ports so as to extend in a direction in which a valve for opening and closing said at least one of said intake and exhaust ports lifts up and down within the combustion chamber, said protruding wall having a jut from a periphery of each valve seat for opening and closing said at least one of said intake and exhaust ports, said jut being dimensioned less than a greater value of a valve lift of said valve for opening and closing said at least one of said intake and exhaust ports at its top dead center position and a product of a constant and a crank angle from a top dead center position of a valve for opening and closing said other of said intake and exhaust ports until said valve for opening and closing said other of said intake and exhaust ports is substantially closed after said top dead center position thereof, said constant being about 0.15 millimeters per degree, a protruding wall gap between an inner wall surface of the cylinder head and an outer periphery of the largest diameter of a valve head of said valve for opening and closing said at least one of said intake and exhaust ports being smaller than said jut, and a valve gap between said outer periphery of the largest diameter of a valve head and an inner periphery of the largest diameter of said combustion chamber being larger than said protruding wall gap.

2. A combustion chamber structure as defined in claim 1, wherein said protruding wall is formed around a valve seat of each intake port.

3. A combustion chamber structure as defined in claim 1, wherein said protruding wall is formed around a valve seat of each exhaust port.

4. A combustion chamber structure as defined in claim 1, wherein said protruding wall is formed around a valve seat of each intake port and each exhaust port.

5. A combustion chamber structure as defined in claim 1, and further comprising a tumble flow producing wall formed at a part of an inner periphery of the combustion chamber so as to extend towards a path in which an intake valve lifts up and down from said valve seat of each said intake port, and an indentation formed within a distance from said valve seat of each intake port equal to said jut so as to increase a distance between said tumble flow producing wall and said outer periphery of the largest diameter of a valve head.

6. A combustion chamber structure as defined in claim 1, wherein a valve overlap period during which both an intake valve and an exhaust valve open is set longer when said internal combustion engine is supercharged than when said internal combustion engine is not supercharged.

* * * * *